INVENTORS
W. A. MENZEL
H. E. RUEHLEMANN

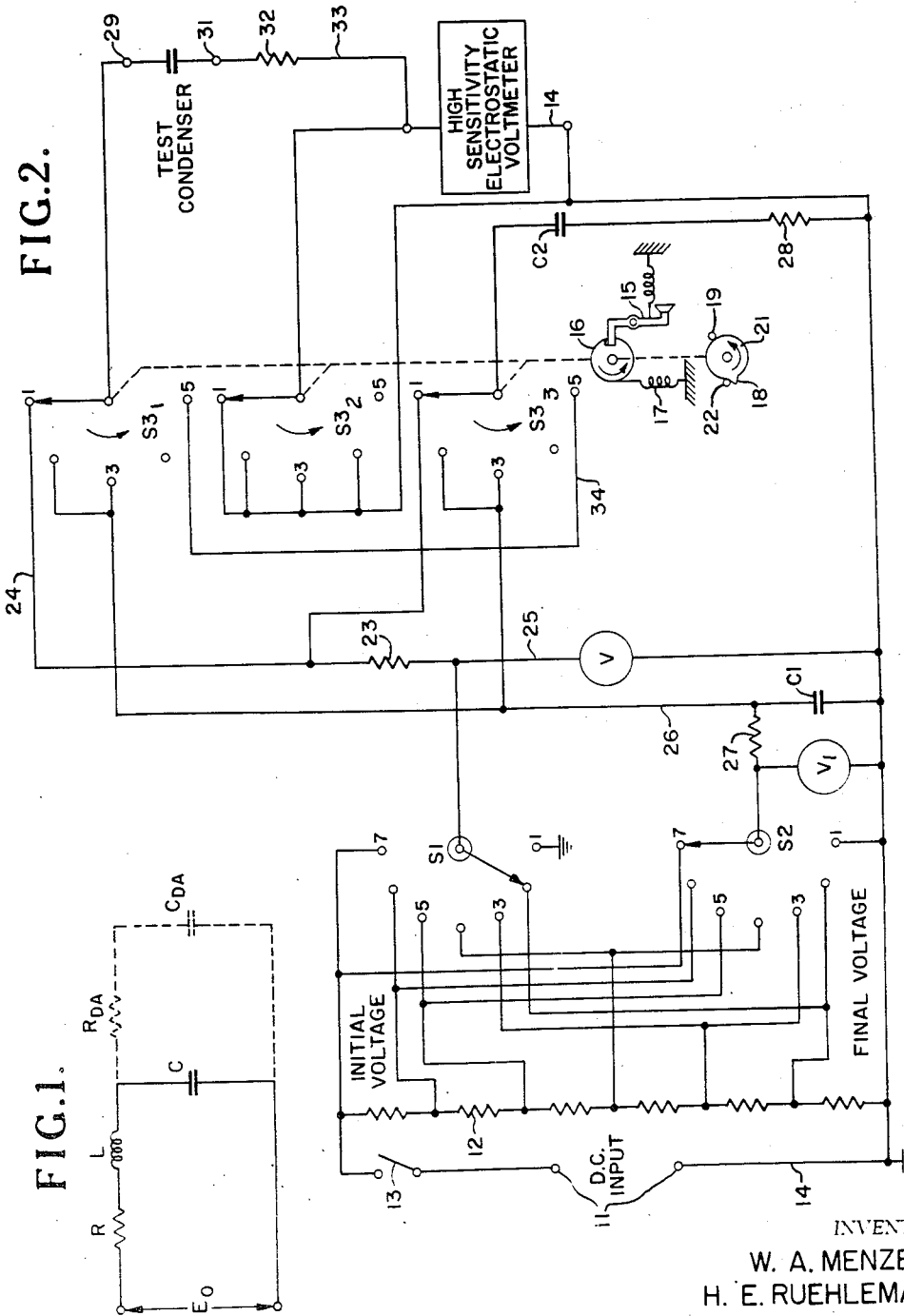

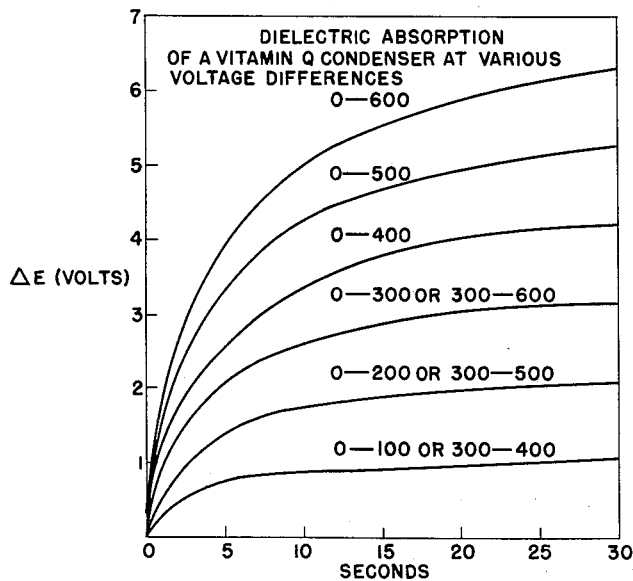
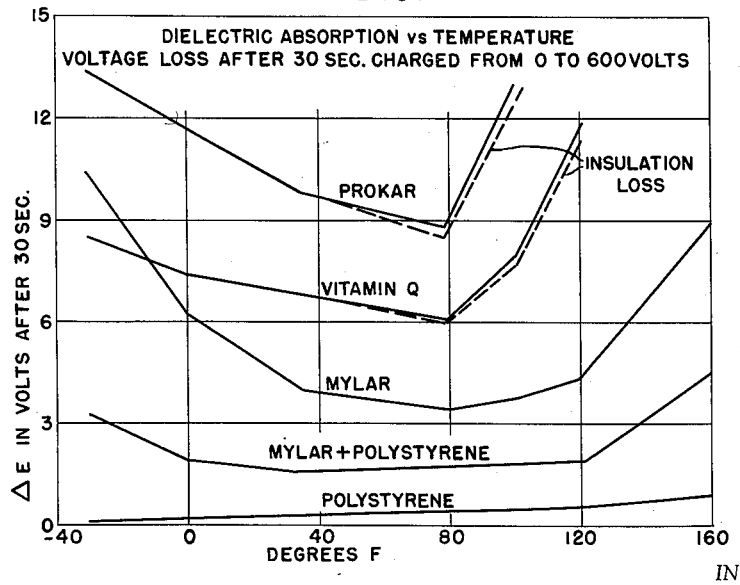

United States Patent Office 2,791,750
Patented May 7, 1957

2,791,750

METHOD AND APPARATUS FOR MEASURING DIELECTRIC ABSORPTION IN A HIGH QUALITY CONDENSER

Wolfgang A. Menzel, Silver Spring, Md., and Herbert E. Ruehlemann, Allentown, Pa., assignors to the United States of America as represented by the Secretary of the Navy Application October 28, 1955, Serial No. 543,632

11 Claims. (Cl. 324—60)

(Granted under Title 35, U. S. Code (1952), sec. 266)

The invention described herein may be manufactured and used by or for the Government of the United States of America for governmental purposes without the payment of any royalties thereon or therefor.

This invention relates to means and a method of measuring dielectric absorption in high quality condensers and more particularly to the testing and measurement of such condensers during the development and production thereof whereby the dielectric absorption of the condensers under various conditions of service may be determined with a high degree of precision.

With the modern development of precision electronic devices, the effect of dielectric absorption of condensers controlling the operation of such devices has assumed added significance particularly with respect to the accuracy of operation thereof. The term "dielectric absorption" as employed herein may be defined as a certain apparent loss in the charge which is not available on the condenser plates after the charge or discharge current, as the case may be, has been interrupted. This dielectric absorption varies with the dielectric material employed in the construction of the condenser, the voltage applied thereto, the charge or discharge time and the temperature of the condenser.

The invention assumes added significance when employed with high quality condensers such, for example, as condensers having a leakage resistance of not less than $10^{11}$ ohms employed in R-C timing circuits suitable for use with military weapons or for non-military use, as the case may be, in which the voltage at one or several condensers is required to change with the passage of time in conformance with predicted nonlinear equations. Unknown dielectric absorption may appear as deviations from theoretical values and thus introduce errors from various factors and conditions which heretofore could not be predicted and controlled.

This invention provides a new and improved method and means for testing and measuring the dielectric absorption of condensers whereby knowledge of these factors and their effect may be beneficially employed in predicting circuit behavior and limitations. These results are achieved by the novel method of testing condensers and the apparatus suitable for making such tests disclosed herein as will be more clearly apparent as the description proceeds.

One of the objects of the present invention is the provision of new and improved means for testing and measuring the dielectric absorption of a high quality condenser.

Another of the objects resides in the provision of a novel apparatus for testing and measuring the dielectric absorption of a condenser under different conditions of service.

A still further object is the provision of new and improved means for comparing the dielectric constant of a condenser to be tested with the dielectric constant of a condenser of which the dielectric constant is known.

Other objects and many of the attendant advantages of this invention will be readily appreciated as the same becomes better understood by reference to the following detailed description when considered in connection with the accompanying drawings wherein:

Fig. 1 is a circuit in which the effects of dielectric absorption of a condenser are shown in dashed outline;

Fig. 2 is a condenser testing circuit embodying the present invention in accordance with a preferred embodiment thereof;

Fig. 4 is a diagrammatic showing of voltage loss of a vitamin Q condenser due to dielectric absorption as a function of applied voltage;

Fig. 6 is a graphic representation of the effect of different temperatures with respect to dielectric absorption of five different types of condensers.

Figure 3:
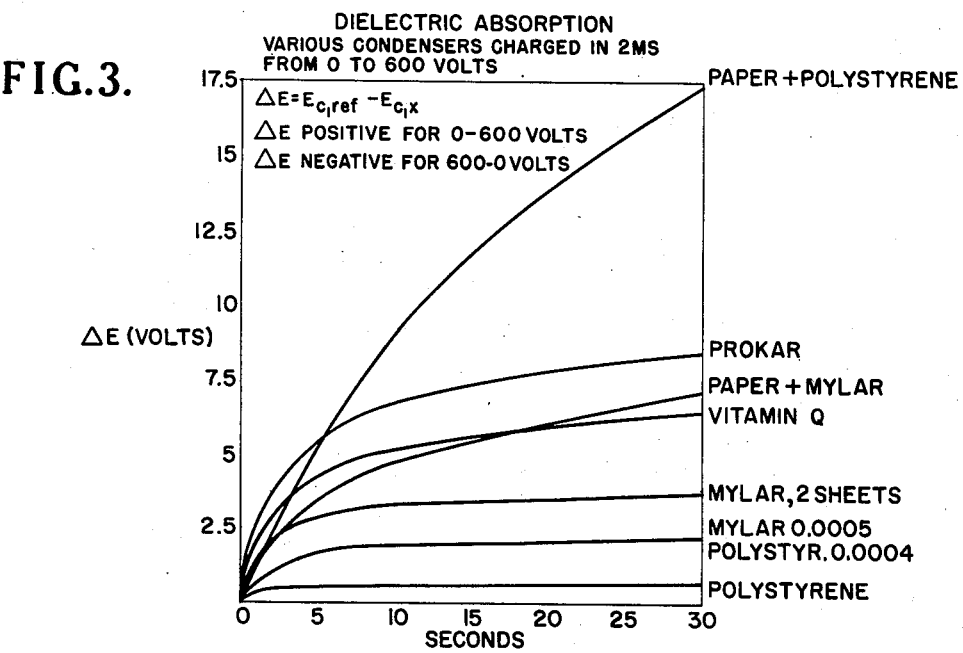
Fig. 3 is a graphic illustration of the reduction in voltage of seven different types of condensers due to dielectric absorption over a thirty second period.

Referring now to the drawings for a more complete understanding of the invention on which like numerals of reference are employed to designate like parts throughout the several views and more particularly to Fig. 1 thereof on which is shown a condenser C charged by a voltage $E_0$, the characteristics of the condenser being shown as including a small resistance and inductance designated by the numerals R and L respectively. The condenser C also possesses the well known characteristic of dielectric absorption as illustrated on Fig. 1 by the dashed circuit including resistance $R_{DA}$ and $C_{DA}$. The capacity element $C_{DA}$ has been diagrammatically illustrated to represent a loss of charge of the condenser C due to dielectric absorption by reason of a small portion of this charge flowing into the theoretical condenser $C_{DA}$ through a high resistance $R_{DA}$. During the condenser charging time a certain amount of charge is applied to condenser $C_{DA}$ by the power supply at $E_0$ and the voltage loss on the plate of condenser C is dependent on the charging time.

It has been found by actual test that if the condenser C is charged from a low impedance source such for example, as a storage condenser of relatively large capacity for more than ten time constants, the theoretical voltage which could be expected at condenser C is defined as $E_0$ which is 100 percent of the voltage applied at the voltage source. The actual voltage of the condenser measured after several minutes following disconnection of the condenser from the charging source has been found to be somewhat less than the charging voltage initially applied to the condenser and this voltage loss has been found to increase with decreasing charge time. The charge or discharge times of a condenser of this order of magnitude are commonly encountered in practical applications so that under conditions where a high degree of accuracy is required, for example in R-C timing circuits, dielectric absorption assumes considerable significance.

The voltage loss due to dielectric absorption, it should be noted, differs from voltage loss due to electrical leakage through the dielectric in that electrical leakage will cause the condenser to be eventually discharged after the charging circuit has been interrupted whereas dielectric absorption causes only a small percentage of reduction of the voltage of the condenser as a result of the absorption of a small fractional portion of the charge into the dielectric material.

A circuit suitable for use with the present invention is shown on Fig. 2 in which a pair of input terminals 11 are adapted for connection to a D. C. input voltage, for example, of the order of 600 volts. A potentiometer 12 is connected acros the terminals 11, a switch 13 preferably being included in the connection. One of the terminals 11 is connected to the switch 13 and the other to grounded conductor 14. Two manually settable switches designated S1 and S2 respectively, are provided, each of the switches having seven contacts selectively engageable by the wiper arm thereof; contact 1 being connected to ground, contacts 2 to 6 being connected to taps on the potentiometer 12, and contact 7 being connected to the contact of switch 13. An arrangement is thus provided in which the voltage of the wiper arms of switches S1 and S2 may be adjusted in 100 volt steps from ground or zero voltage to the full D. C. input voltage selectively in accordance with the instant setting of each of the switch wipers.

There is also provided a charging switch S3 comprising three levels or banks, each bank having five contacts selectively engageable by a wiper individual thereto. The three wipers are ganged together and normally engage contact 1 of their respective banks in which position they are held by a key or latch 15 engaging a notch in the disc 16. The disc is quickly rotated in a counter-clockwise direction as viewed in the drawing by a spring such as the spring 17 illustrated as the key 15 is depressed thereby quickly moving the wipers across the contacts of their respective banks until they engage their contacts 5. When this occurs, the wiper assembly is brought to rest by a stop member 18 engaging stop pin 19. The resetting of the switch to its initial start position is achieved by knob 21 which, when manually actuated, causes the wipers to be returned to engagement with their contacts 1 and latched in this position by the key latch 15. When in this position further movement of knob 21 and the wipers associated therewith is prevented by a second stop member 22 as the stop 18 moves into engagement therewith.

Contact 1 of banks 1 and 3 of switch S3 are connected together and to resistance 23 by conductor 24 from which the circuit is continued by way of conductor 25 to the wiper of switch S1 and to a voltmeter V, the other terminal of the voltmeter being grounded to conductor 14. Contacts 2 and 3 of banks 1 and 3 of switch S3 are connected together and to one terminal of condenser C1 by conductor 26 and to one terminal of resistance 27, the other terminal of the resistance being connected to voltmeter V1 and to wiper of switch S2. Contact 4 of banks 1 and 3 of switch S3 are unconnected and contacts 5 of these banks are connected together by conductor 34. Wiper 3 of switch S3 is connected to a standard polystyrene condenser C2 from whence the circuit is continued by way of resistance 28 to ground. Condenser C2 has a capacity preferably of 1 microfarad and employs a dielectric composed of polystyrene, the dielectric absorption of which is small and known. The capacity of condenser C1 is preferably in the order of 50 microfarads. The resistances 23 and 27 are of the order of 5,000 ohms and resistance 28 is preferably 100 ohms.

Contacts 1, 2, 3 and 4 of bank 2 of switch S3 are connected to ground at conductor 14 and contact 5 of this bank is unconnected. Wiper 1 of switch S3 is connected to test terminal 29 from whence the circuit is continued by way of the condenser to be tested, test terminal 31, resistance 32 and conductor 33 to wiper 2 of switch S3. A high sensitivity electrostatic voltmeter such for example, as a Keithley vacuum tube electrometer model 200, is connected between conductors 33 and 14 and is normally shorted by wiper 2 of switch S3. Resistance 32 may be of the order of 100 ohms and the condenser to be tested has a capacity equal preferably in the order of magnitude to the capacity of condenser C2, in the assumed case 1 microfarad although, if desired it may be of different value. Oscillations in the charge and discharge circuit of the condenser to be tested are prevented by resistance 32 in series therewith.

The operation of the circuit of Fig. 2 will now be described. Let it be assumed, by way of example, that a 1 microfarad condenser to be tested is connected to test terminals 29—31, that switch S2 has been moved into engagement with its contact 7 and switch S1 has been moved into engagement with its contact 2. Let it furthermore be assumed that input terminals 11 are connected to a source of 600 volts D. C., switch 13 is closed and switch S3 is in the home position shown on the drawing. Under the conditions assumed, condenser C1 is charged through resistance 27 to a potential of 600 volts and condenser C2 and the test condenser are each charged to a potential of 100 volts as evidenced by the reading of voltmeters V1 and V respectively.

The start key 15 is now depressed. As the latch end of key 15 is disengaged from the notch in disc 16, spring 17 causes the switch S3 wiper assembly, disc 16 and knob 21 to be moved quickly from the initial position of the wipers in engagement with their contacts 1 to a final or rest position with the wipers in engagement with their contacts 5. The switch S3 is so constructed and arranged that the time of contact of its wipers with contacts 2, 3 and 4 of their respective banks is 2 milliseconds as each contact is momentarily engaged thereby. This time of contact exceeds the normal charging time of condensers C2 and the test condenser by a factor of ten and thus the condenser C2 and the test condenser are fully charged to 600 volts as the switch arms move across bank contacts 2. To insure that these condensers will receive their full charge regardless of a condition of chatter or other faulty contact between wipers 1 and 3 with their respective contacts 2, contacts 2 of banks 1 and 3 are connected to their respective contacts 3, whereby there is no possibility of failure of the condenser C2 and the test condenser to be fully charged when the switch wipers have passed beyond their respective contacts 3.

In the assumed example, storage condenser C1 is charged to 600 volts, the capacity of condenser C1 is 50 microfarads and the capacity of condenser C2 and the test condenser each is 1 microfarad. The potential of the charges on condenser C2 and the test condenser, therefore, are immediately brought to the charged value of nearly 600 volts on condenser C1 from an initial charge of 100 volts, in the example assumed, as wipers 1 and 3 of switch S3 engage their respective contacts 2. During movement of the switch wipers over their contacts 1 through 4, the electrostatic voltmeter, it will be noted, was shorted by wiper 2 of switch S3 and as wiper 2 of switch S3 moves out of engagement with its contact 4, this short circuit is removed. As the switch moves into its final position, a circuit is closed from test terminal 31 by way of resistor 32 conductor 33 to the electrostatic voltmeter from whence the circuit is continued by way of conductor 14, resistance 28, condenser C2, wiper 3 and the contact 5 of switch S3, conductor 34, contact 5 and wiper 1 of switch S3 and thence to the other test terminal 29 to which the test condenser is connected. As the voltage of the test condenser drops as the result of dielectric absorption, the voltage differential between this condenser and standard condenser C2 is made manifest by the electrostatic voltmeter.

When it is desired to reset the tester circuit of Fig. 2, the charging switch S3 is restored to normal by knob 21 with the stop member 18 in engagement with stop pin 22 and, if desired, switch 13 maybe opened during or prior to this restoring operation.

Whereas in the foregoing example, the test condenser was charged from an initial voltage of 100 volts to 600 volts, it will be understood that this by way of example only as the circuit of Fig. 2 is adaptable for various different tests such, for example, as applying ground to both terminals of the condenser under test prior to the actuation of switch S3 and that during the travel of the switch S3 over its contacts 2 and 3 the voltage of the test condenser may be suddenly increased to a predetermined value selectively in accordance with the instant setting of switch S2. Furthermore, if desired, the condenser under test may be initially charged to any desired voltage prior to actuation of switch S3 and a selected voltage of lower value or ground, as the case may be, may be suddenly applied to the test condenser by switch S3 as the wipers thereof pass over contacts 2 and 3.

It has been found that condensers employing polystyrene as a dielectric possess dielectric absorption to a small or negligible degree and the charge or discharge time or previous history conditions of the condenser has no effect on the time values and timing accuracy thereof. Although a polystyrene condenser will operate satisfactorily in timing circuits requiring a high degree of accuracy, it has been found that the application of such a condenser is restricted as the result of space limitations or possible exposure to higher temperatures. Several newly developed dielectric materials have recently been made available and their characteristics with respect to dielectric absorption have been tested and measured by the circuit of Fig. 2. The impedance of the electrostatic voltmeter employed with the circuit of Fig. 2 preferably has a value at least as high as $10^{14}$ ohms shunted by approximately 6 micromicrofarads. When the leakage resistance of the condenser under test is above $10^{12}$ ohms times microfarad, its influence on the instrument readings is negligible. When its value is lower, however, its influence must be separately determined. Condensers having a leakage resistance of less than $10^{11}$ ohms times microfarad, however, should not be used in high quality R-C timing circuits and the insulation of the tester and of the reference condenser C2, therefore, is preferably in excess of $10^{13}$ ohms. The large storage condenser C1 is employed to charge both the standard or reference condenser C2 and the condenser under test for the reason that the impedance of a properly designed storage condenser is low and does not change with the life of the equipment. In the case of the discharge of both condensers from different initial voltages to zero final voltage, a storage condenser would not be required but for ease of operation and to obtain comparable results between charge and discharge tests the storage condenser is employed in both cases.

On Fig. 3 is shown various instrument readings obtained with the circuit of Fig. 2 versus time for seven different types of condensers. All of these condensers were charged from zero to 600 volts after an additional condenser shorting time of more than ten minutes. The curves shown on Fig. 3 represent the mean values of ten readings taken during a thirty second interval. In most of the condensers tested, the voltage loss, due to dielectric absorption, is close to its final value within thirty seconds and it is our conclusion, therefore, that this time interval is sufficient to allow accurate determination of the quality of the condenser under test. It will be noted, however, that the two condensers having as a dielectric one sheet of paper added to polystyrene or Mylar respectively will reach an equilibrium state after an appreciably longer time than 20 seconds and that the intial voltage increase is slower.

The polystyrene condenser, which was selected for these tests, possesses a small amount of dielectric absorption and the dielectric absorption of this condenser was found to be not the result of the polystyrene material but the result of minute air bubbles which were trapped in the condenser section. In each of the tests shown on Fig. 3 the various condensers were charged within two milliseconds from zero to 600 volts or vice versa and the figures appearing in the ordinate at the left of the figure as viewed in the drawing represent the voltage losses from the original value of 600 volts, the figure 17.5, for example, representing a final voltage of 582.5 at which the paper +polystyrene condenser was charged at the expiration of thirty seconds after the charging circuit had been interrupted.

It is now known that the voltage loss due to dielectric absorption does not reach its final value in thirty seconds. A longer time, therefore, which varies appreciably with various types of condenser dielectrics is necessary for absolute measurement. On the other hand, when a series of measurements is made in short intervals with the same condenser, a certain amount of dielectric charge may remain in the condenser dielectric after each test. It therefore becomes necessary to short the condenser after each test for several minutes before the next test on the condenser is performed when extreme accuracy of measurement of the dielectric constant is to be obtained.

Referring now to Fig 4, on which is shown in graphic form changes in voltage loss due to dielectric absorption as a function of applied voltage, the six curves shown thereon illustrate the results obtained with a vitamin Q condenser. In the first series of tests, after an initial condenser shorting time of more than 10 minutes, the condenser was charged from 0 to 100 volts and the charge was increased to 600 volts by increments of 100 volts each. Within this voltage range the dielectric absorption was proportional to the incremental change in applied voltage. This condenser behavior was also confirmed in a second series of tests in which the condenser was precharged to 300 volts for more than 10 minutes and in which the voltage was then raised to 400, 500 and 600 volts, respectively. These tests clearly show that the change of voltage alone determines the amount of dielectric absorption and not the potential at the condenser. This is clearly illustrated in the case of 0 to 200 volts, for example, being equal to the change from 300 to 500 volts. Roughly linear relationship between voltage changes and dielectric absorption was observed in practically all of the condensers which were checked by the circuit of Fig. 2.

Figure 5:
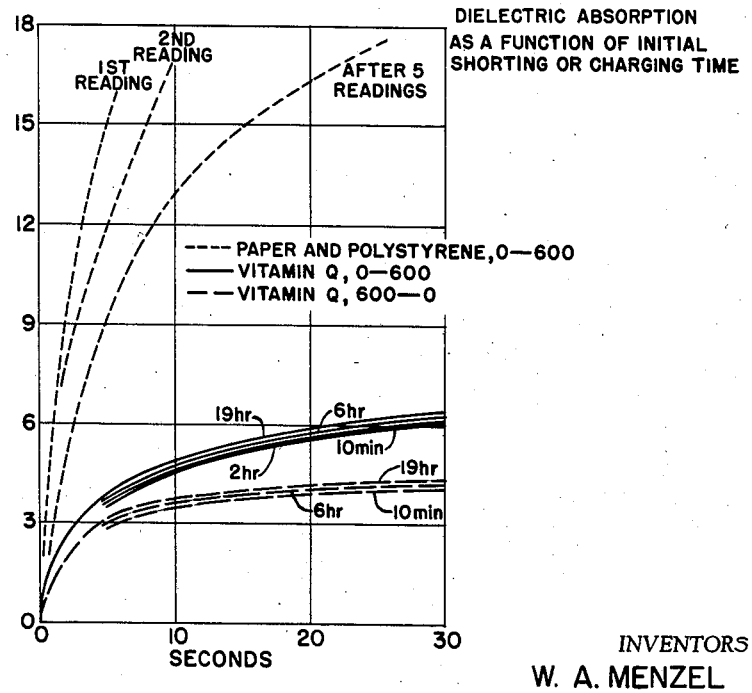
Fig. 5 is a graphic representation of voltage losses in different condensers due to dielectric absorption during successive tests following a shorting operation.

Since it is known that the voltage loss due to dielectric absorption does not reach its final value within 30 seconds, a considerably longer time which varies with various types of condenser dielectrics during which the condenser is shorted is necessary for absolute measure. On the other hand, when a series of measurements is made in succession during short intervals of time with the same condenser, a certain amount of dielectric charge may remain after each test on the condenser dielectric and it has been found necessary to short the condenser after each test for several minutes before the next test is performed to obtain a high degree of accuracy of measurements. On Fig. 5 is shown in graphic form the result of a series of tests with various shorting times on various types of condensers. From these curves it will be noted that the voltage loss due to dielectric absorption with the condensers shorted for various times ranging from ten minutes to nineteen hours before testing show only small deviations, the loss appearing greater when the condenser is shorted for a longer time. The same results were obtained with all the other types of condensers tested except in the case of a tested condenser using a combination of paper and polystyrene. This condenser had a high voltage loss on the first reading whenever the condenser was shorted for a long time before the test. After approximately five subsequent readings with ten minute shorting time therebetween, the voltage loss was appreciably smaller and fairly constant as illustrated on Fig. 5. From the foregoing it is clearly apparent that ten minutes shorting time is insufficient to discharge the dielectric when it has been previously exposed to the electric field for thirty seconds.

A series of tests were made on various types of condensers by employing the tester circuit of Fig. 2 with the condensers at room temperatures and using the method to discharge from a higher initial voltage to a lower final voltage. The condensers were shorted before the tests for various shorting times ranging from ten minutes to nineteen hours. They were initially charged for 1.5 minutes at each test and readings were taken from the electrostatic voltmeter after the switch S3 had engaged its contacts 5. From these tests it was found that there is only a small deviation due to varying the shorting time in this range. The voltage recovery however, is appreciably lower than the voltage loss in the test previously described and the ratio of recovery voltage to voltage loss is different for each different type of condenser tested. This difference in recovery rate obviously was not caused by the leakage resistance of the dielectric for the reason that all of the condensers tested, with a single exception, had an insulation resistance of more than $10^{11}$ ohms times microfarads at room temperature. It is our opinion that this difference may be satisfactorily explained by noting that, in the case of the charging measurements, the dielectric is subjected to a high field during the entire measurement time of thirty seconds, while the decrease in field strength because of voltage loss is small. During this period, the dielectric is being formed and is removing charge from the condenser plate. In the case of discharge measurements only the small field from the recovery voltage is present during the time of the measurement so that the forces tending to produce dielectric recovery are small and in opposition to the charge accumulating on the condenser plate.

On Fig. 6 is shown the dielectric absorption of five different condensers when exposed to different temperatures. On this figure is shown the voltage losses after thirty seconds versus temperature when the condensers are charged from zero to 600 volts. Readings at higher temperatures should be corrected in cases where the leakage resistance of the condenser had dropped below $10^{11}$ ohms times microfarad. Such a correction is shown by the dashed lines for the vitamin Q and Prokar condensers.

All condensers with the exception of the polystyrene condenser, also show an increase in voltage loss at lower temperatures, which increase cannot be satisfactorily explained by increase leakage resistance which, for these high quality condensers should be negligible at the low temperature range. Precautions were taken to prevent small influences resulting from humidity at the terminals. It is believed, therefore, that a certain amount of this increase in dielectric absorption at lower temperatures is due to the fact that, at such lower temperatures, the dielectric absorption process is slower so that a smaller percentage of the dielectric absorption is covered during the charge cycle and a larger percentage occurs thereafter.

From the foregoing it will be clearly apparent that we have provided a new method of testing and measuring the dielectric absorption of a high quality condenser by applying a test condition to the condenser and to a standard condenser of known and negligible dielectric absorption characteristic which may comprise short circuiting the condensers or applying a fixed potential thereto for a predetermined period of time and thereafter momentarily applying a different potential or a short circuit, as the case may be, to both of the condensers for a period of time in excess of the time constants thereof and immediately thereafter connecting the condensers in parallel, the parallel connection including a high sensitivity electrostatic voltmeter whereby the decrease in potential of the condenser under test with respect to the potential of the standard condenser is continuously made manifest. A circuit arrangement suitable for achieving this result is also disclosed and described in detail.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A device for testing the dielectric absorption of a condenser comprising a standard condenser for comparison, a condenser to be tested, a source of voltage, voltage dividing means connected to said source of voltage, means including a first switch settable to different settings and connected to said voltage dividing means for selecting a voltage to be applied to said condensers, in accordance with the instant setting of the switch means, a storage condenser, a second switch means connected to said voltage divider for selecting a second voltage to charge said storage condenser, means for sequentially connecting said standard and testing condensers in parallel for simultaneous charging from the voltage selected by said first switch, means for thereafter connecting said standard and test condensers momentarily to said storage condenser, means for disconnecting said standard and testing condensers from said storage condenser, and means for thereafter connecting said standard and said tested condensers in parallel, said last-named means including an electrostatic voltage measuring device whereby the difference in the voltages of said standard and tested condensers due to dielectric absorption of the tested condenser is continuously made manifest.

2. Apparatus for testing the dielectric absorption of a high precision condenser which comprises a standard condenser of low dielectric absorption characteristic and of the same capacity as the tested condenser, a storage condenser of greater capacity than the capacity of said standard and tested condensers, means for charging said storage condenser to a predetermined potential, means for applying a different potential simultaneously to said standard and tested condensers, means for disconnecting said standard and tested condensers from said different potential and immediately thereafter momentarily connecting said standard and tested condensers to said storage condenser, a high sensitivity electrostatic voltmeter, and means for connecting said standard and tested condensers in series opposition to said voltmeter when the standard and tested condensers have been disconnected from said storage condenser whereby the dielectric absorption of said tested condenser may be made manifest on said voltmeter as a differential value of voltage between said standard and tested condensers.

3. In a circuit of the character disclosed for testing and measuring the dielectric absorption of a test condenser comprising a voltage divider adapted for connection to a source of D. C. voltage, means including a multi-contact switch connected to said voltage divider for selecting a predetermined value of said voltage, a storage condenser connected to the movable element of said switch and to one terminal of said voltage divider for storing a charge thereon corresponding to said predetermined voltage, a second switch having a plurality of contacts connected to said voltage divider for selecting a second value of said voltage, a third switch having a plurality of wipers movable from an initial home position to a final rest position, means for releasably locking said third switch in said initial position, resilient means for quickly operating said third switch to said final position as the switch is unlocked, a standard condenser connected to one wiper of said third switch, means for connecting said test condenser to a second wiper of said third switch, means including a third wiper of said third switch for connecting together the corresponding terminals of said test and standard condensers while the switch is in said initial position, means for applying said different voltage from the moving element of said second switch to said first and second wipers of the third switch whereby the standard and test condensers are initially charged to said different voltage, means on said third switch for switching the charging circuits of said standard and test condensers from the moving element of said second switch to said storage condenser as the third switch operates and for thereafter immediately interrupting the connection to said storage condenser, a high sensitivity electrostatic voltmeter normally shorted by the third wiper of the third switch until the third switch moves into said home position, and means controlled by said first and second wipers of the third switch for establishing a series circuit between said standard and test condensers and said voltmeter whereby the loss of voltage of the test condenser by dielectric absorption is made manifest as a voltage differential between said standard and test condensers.

4. A claim according to claim 3 in which the momentary connection of the standard and test condensers to the storage condenser is established for a period of time in excess of the time constants of the charging circuits for said test and standard condensers.

5. A claim according to claim 3 in which said storage condenser is charged to a value of 600 to 625 volts.

6. A claim according to claim 3 in which the capacity of said standard and test condensers each is 1 microfarad.

7. A claim according to claim 3 in which the dielectric material of the standard condenser is composed of polystyrene.

8. A claim according to claim 3 in which the charge and discharge circuits to the test condenser includes a resistance element thereby to prevent electrical oscillations as the condenser is charged and discharged respectively.

9. A claim according to claim 3 in which the first named switch is provided with contact means connected to said storage condenser for maintaining the storage condenser normally completely discharged.

10. A claim according to claim 3 in which the second switch comprises contact means connected to said standard and test condensers for normally maintaining the standard and test condensers completely discharged.

11. A method of testing a condenser for dielectric absorption comprising the steps of simultaneously applying a first voltage to a standard polystyrene condenser and to the condenser being tested, isolating both condensers from said first voltage, momentarily applying a second voltage simultaneously to both of said condensers for a time in excess of the time constants of the condenser charging circuits, said second voltage being of different value from said first voltage, isolating said condensers from said second voltage and immediately thereafter connecting an electrostatic voltmeter between said condensers in such manner that the loss of voltage of the test condenser due to dielectric absorption therein is made continuously manifest as a voltage differential between said condensers.

References Cited in the file of this patent

UNITED STATES PATENTS

| | | |
|---|---|---|
| 2,177,569 | Jorgensen et al. | Oct. 24, 1939 |
| 2,408,727 | Blitz | Oct. 8, 1946 |
| 2,455,543 | Williams | Dec. 7, 1948 |